(12) United States Patent
Lindberg et al.

(10) Patent No.: US 6,276,796 B1
(45) Date of Patent: Aug. 21, 2001

(54) EYEGLASS FRAME, AN EYEGLASS, AND A METHOD OF MANUFACTURING AN EYEGLASS

(75) Inventors: Poul-Jørn Lindberg, Egå; Lars Bojvad Jensen, Højbjerg, both of (DK)

(73) Assignee: Lindberg A/S, Abyjoj (DK)

(*) Notice: Subject to any disclaimer, the term of this patent is extended or adjusted under 35 U.S.C. 154(b) by 0 days.

(21) Appl. No.: 09/541,280

(22) Filed: Apr. 3, 2000

Related U.S. Application Data

(63) Continuation-in-part of application No. PCT/DK98/00434, filed on Oct. 8, 1998, now abandoned.

(30) Foreign Application Priority Data

Oct. 16, 1997 (DM) .................................................. 1188-97

(51) Int. Cl.[7] .................................................. G02C 1/08
(52) U.S. Cl. .................................. 351/90; 351/92; 351/97
(58) Field of Search ................................ 351/90–101, 152

(56) References Cited

U.S. PATENT DOCUMENTS

| | | |
|---|---|---|
| 2,614,459 | 10/1952 | Ditto . |
| 3,542,460 | 11/1970 | Smith et al. . |
| 3,589,802 | 6/1971 | Amaru . |
| 3,905,085 | 9/1975 | Whiting et al. . |
| 5,270,743 * | 12/1993 | Hofmair et al. ........................ 351/86 |
| 5,293,185 * | 3/1994 | Berger et al. ........................... 351/95 |
| 5,760,866 * | 6/1998 | Wedeck et al. ........................ 351/92 |

* cited by examiner

*Primary Examiner*—Huy Mai
(74) *Attorney, Agent, or Firm*—Thomas R. Vigil

(57) ABSTRACT

An eyeglass frame comprising a frame front (15) with front end pieces (11) for the attachment of temple bars and with a pair of straps (7), each strap being formed in the shape of a loop adapted for peripheral engagement with a respective glass with respective strap member ends in generally abutting relationship, and provided with closure means (16,17) for interconnecting the respective strap. A pair of resilient members, each one adapted for resiliently tensioning a respective strap around the glass. Each closure means comprises a first and a second hook member, formed integrally with respective strap ends, and adapted so as to retain a mutual engagement.

14 Claims, 4 Drawing Sheets

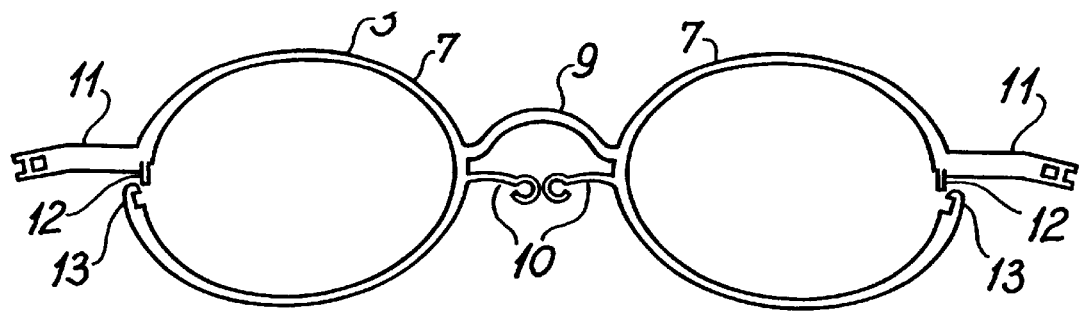
Fig. 2
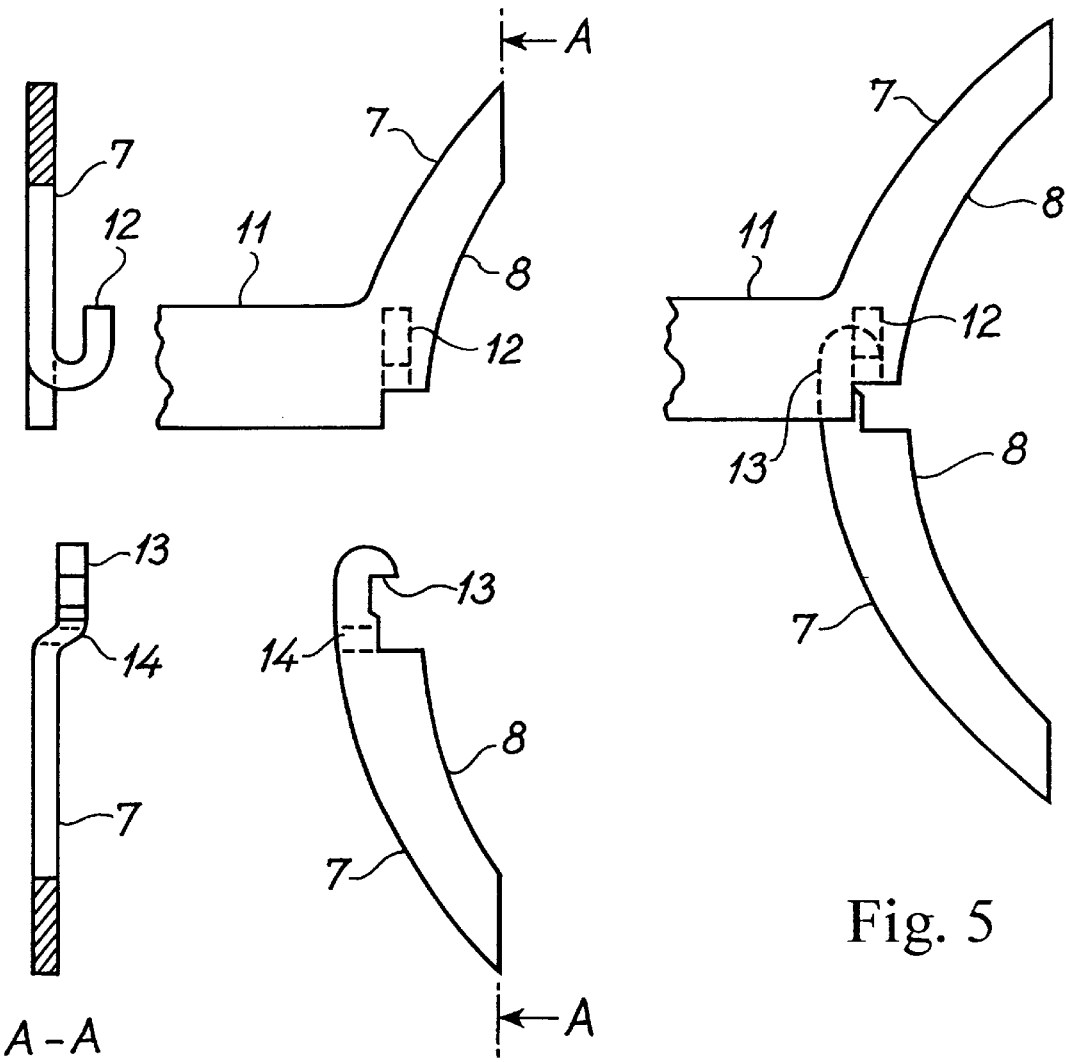
Fig. 5
A-A
Fig. 4    Fig. 3

EYEGLASS FRAME, AN EYEGLASS, AND A METHOD OF MANUFACTURING AN EYEGLASS

CROSS-REFERENCE TO RELATED APPLICATIONS

This is a continuation-in-part of International Patent Application PCT/DK98/00434 with an international filing date of Oct. 8, 1998, now abandoned. This application is based on application No. 1188/97 filed in Denmark on Oct. 16, 1997, the contents of which are incorporated hereinto by reference.

BACKGROUND OF THE INVENTION

1. Field of the Invention

The present invention relates to an eyeglass frame, an eyeglass, and a method of manufacturing an eyeglass.

More specifically the invention relates to eyeglass frames adapted for retaining glasses by means of engaging a peripheral edge hereof by a rim. Still more specifically the invention relates to eyeglass frames wherein the rim engaging the glasses is slit so as to permit selective opening in order to facilitate removal and insertion of a glass.

As used herein, the term eyeglass relates to the well known accessory which substantially comprises two lenses of glass or of other refractive or tinted, transparent material intended to be worn in front of the eyes of the user enabling him to obtain a corrected or a darkened view through the glasses, and a form of spectacle frame arranged to keep the lenses or glasses expediently fixed in the preferred position of use, wherein the wearer can look straight forward with both eyes and with parallel lines of vision through the respective lenses.

2. Description of the Prior Art

U.S. Pat. No. 5,325,132 describes an eyeglass frame with split rims for engaging the glasses, wherein the split rims are closed by respective connecting devices, which connecting devices are spring loaded and adapted for being turned between an unlocked and a locked position in order to selectively close the rim. The connecting mechanism comprises a number of small parts, which require complicated manufacturing and assembly. The mechanism is likely to create a somewhat bulky appearance, which may by some users be considered undesirable.

U.S. Pat. No. 3,905,085 describes an eyeglass with split rims wherein the split rims are secured by a screw which holds together a pair of lugs riveted to respective ends of the rim. This solution involves several small parts which are somewhat complicated in manufacturing and assembly and which may detract from the visual appearance of the eyeglass.

U.S. Pat. No. 5,135,296 describes an eyeglass wherein each of the glasses is provided with a peripheral groove in the edge, and wherein each of the rims of the frame comprises two sections of wire received in the groove and shaped for peripherally engaging the glass. This solution involves -a plastic deformation of the wires, thus exchanging the glasses involves repeated deformation of the wire with a risk of adversely affecting the wire structure.

SUMMARY OF THE INVENTION

The invention, in a first aspect, provides an eyeglass frame comprising a frame front with front end pieces for the attachment of temple bars and with a pair of strap members, each strap member providing a loop adapted for peripheral engagement around a respective glass and closure means for interconnecting respective opposing strap member ends in generally abutting relationship in order to close said loop, at least one of said strap members comprising a resilient member adapted for resiliently tensioning said one strap member around the glass, the closure means of said one strap member comprising a first and a second opposing hook member, formed integrally with said respective strap member adjacent respective opposing ends thereof, said closure means being adapted for allowing selective release of the engagement by displacing said first hook member, against a bias by said resilient member, in a direction substantially along the plane of the glass and away from the edge of the glass, while restraining said second hook member in a stationary position relative to the glass.

In this eyeglass frame the resilient member may be provided by suitable forming of the strap member or by the provision of dedicated resilient means. The resilient member should be adapted to allow a resilient yielding of the strap engagement, sufficient for permitting disconnecting the cooperating pairs of hook means, without any plastic deformation. The strap retains the glass by resiliently tensioned interengaging hook means, thus the frame keeps a firm engagement of the glass. The resilient tensioning also allows for some variation in the size of the glass and the groove while still achieving a good fit.

According to a preferred embodiment, the frame front is formed with a respective second hook means being situated adjacent a respective front end piece. Since opening of the rim involves lifting away the first hook means, any lift of the second hook means, such as might occur by occasional pulling in the front end piece, will affect the pair of interacting hook means in the direction towards closing the hook engagement, i.e. there is no danger of loosening the hook engagement by such accidental loading.

According to a preferred embodiment, the front end pieces comprise respective lateral extension strips and the respective opposing strap ends of each strap member are joined in abutting relations so as to create the visual impression, as seen from the front of the frame, of a narrow slit extending along the direction of an edge of the respective extension strip. Thus the slit in the rim visually continues an edge line present in the frame, which creates a harmonic visual appearance.

According to a further preferred embodiment, at least one of the hook means comprises a sheet member with a part that is resilient in bending. Hereby suitable resilient properties are designed into the product by suitable shaping of the integral hook means in order that the resilience is provided without requiring the addition of dedicated components.

According to a preferred embodiment, the frame front including the hook means as well as the front end pieces and arms for securing nose pads, are formed essentially by cutting and bending operations from a single piece of sheet material. This simplifies manufacturing and assembly while still permitting a wide variety of designs by suitably adapting the cutting and bending operations. The first hook means may according to one embodiment be provided by cutting a projecting tongue and by bending this tongue away from the plane of the sheet member and into a U-shape, while the second hook means is provided by cutting and joggling a hook extension. Joggling the hook extension compensates for the offset in the point of hook interengagement relative to the plane of the sheet member created by the simple bending of a U-shaped tongue.

According to the preferred embodiment, each of the resilient members comprises a compressible body, adapted for being inserted between the strap member and the glass. The compressible body may be used in combination with other resilient means in order that the degree of resilience required will be added up by contributions from different resilient means, or the resilient body may on its own provide all of the resilience required in respect of one strap member.

According to a preferred embodiment, the compressible body comprises an O-ring placed in peripheral contact with the glass. This is a simple way of providing resilience without impairing the visual appearance of the eyeglass. This embodiment has particular advantage in combination with a glass with a peripheral groove adapted for receiving the O-ring in the bottom of the groove, and adapted for receiving an edge of the strap member inside the groove on top of the O-ring.

The invention, in a second aspect, provides an eyeglass comprising an eyeglass frame, which frame comprises a frame front with front end pieces for the attachment of temple bars and with a pair of strap members, each strap member providing a loop adapted for peripheral engagement around a respective glass and closure means for interconnecting respective opposing strap member ends in generally abutting relationship in order to close said loop, at least one of said strap members comprising a resilient member adapted for resiliently tensioning said one strap member around the glass, the closure means of said one strap member comprising a first and a second opposing hook member, formed integrally with said respective strap member adjacent respective opposing ends thereof, said closure means being adapted for allowing selective release of the engagement by displacing said first hook member, against a bias by said resilient member, in a direction substantially along the plane of the glass and away from the edge of the glass, while restraining said second hook member in a stationary position relative to the glass, together with glasses and temple bars fitted on said frame.

This provides an eyeglass wherein replacement of the glass can be carried out with operations involving resilient deformation in parts of the frame, avoiding any plastic deformation, thus permitting a practically unlimited number of replacements without degrading the structure of the frame or any part thereof. The eyeglass obtains a firm engagement of the glasses. Fitting of glasses is simplified, as the frame adapts to variations in the sizes of the glasses. The eyeglass further makes manufacturing of a wide range of designs economically feasible.

According to a preferred embodiment, the glasses are provided with a peripheral groove adapted for receiving an edge of the respective strap. Thus the glasses by the fitting engagement of the strap edge supports the strap and prevents bending the strap, thereby contributing to the structural integrity of the frame front. This permits minimizing the dimensions of the strap member without sacrificing a suitable structural integrity of the eyeglass as a whole.

The invention, in a third aspect, provides a method for the manufacturing of an eyeglass comprising selecting a sheet of material, cutting from said sheet a blank including a pair of strap members, each strap member comprising an open loop with a slit and with a pair of cooperating opposing hook members adjacent the slit, inserting a pair of glasses, to be engaged each glass by a respective strap member, and closing the strap members around the respective glasses with the respective pair of opposing hook members in latching engagement so as to resiliently tension said strap members around the respective glasses.

This method provides the manufacturing of eyeglasses within a wide range of designs by simple manufacturing steps and with a low cost of raw materials and parts. Mounting of the glasses takes place by a simple set of operations. The mount will adapt to manufacturing tolerances on the glasses as well as on the frame, which is a significant advantage considering that the manufacturing of the frame and of the glasses typically takes place by separate entities and that mounting of the glasses typically will be performed by the optometrist.

According to a preferred embodiment, the method comprises the step of selecting the size of the O-ring according to the particular dimensions of the glass and of the strap member in order to adjust the tension prevailing in the strap member when latched around the glass as appropriate. This will accommodate a greater range of variation in the dimensions of the glass and of the strap ember while still permitting a perfect match since electing a different size of O-ring as appropriate can compensate for manufacturing tolerances.

The possibility of compensating any tolerances in the match also relieves the resilient member in the strap of the function requirement of otherwise compensating for wide manufacturing tolerances. Therefore the resilient member in the strap may in this case be adapted for providing only a very small resilient yield.

BRIEF DESCRIPTION OF THE DRAWINGS

Further features and advantages of the invention will appear from the description of preferred embodiments given below with reference to the drawings in which FIG. 2 shows a plan view of a blank for the front of a frame according to the invention, FIG. 3 illustrates an enlarged view of a detail from FIG. 2, FIG. 4 illustrates a section in FIG. 3 by the line A—A, FIG. 5 shows the same detail as shown in FIG. 3 but in a state where the rim of the frame has been closed.

BEST MODE FOR CARRYING OUT THE INVENTION

All figures are schematic and not necessarily to scale and show only details that are essential for understanding the invention, while other details have been omitted for the sake of clarity. Throughout the figures the same references are used about identical or similar items.

Figure 1:
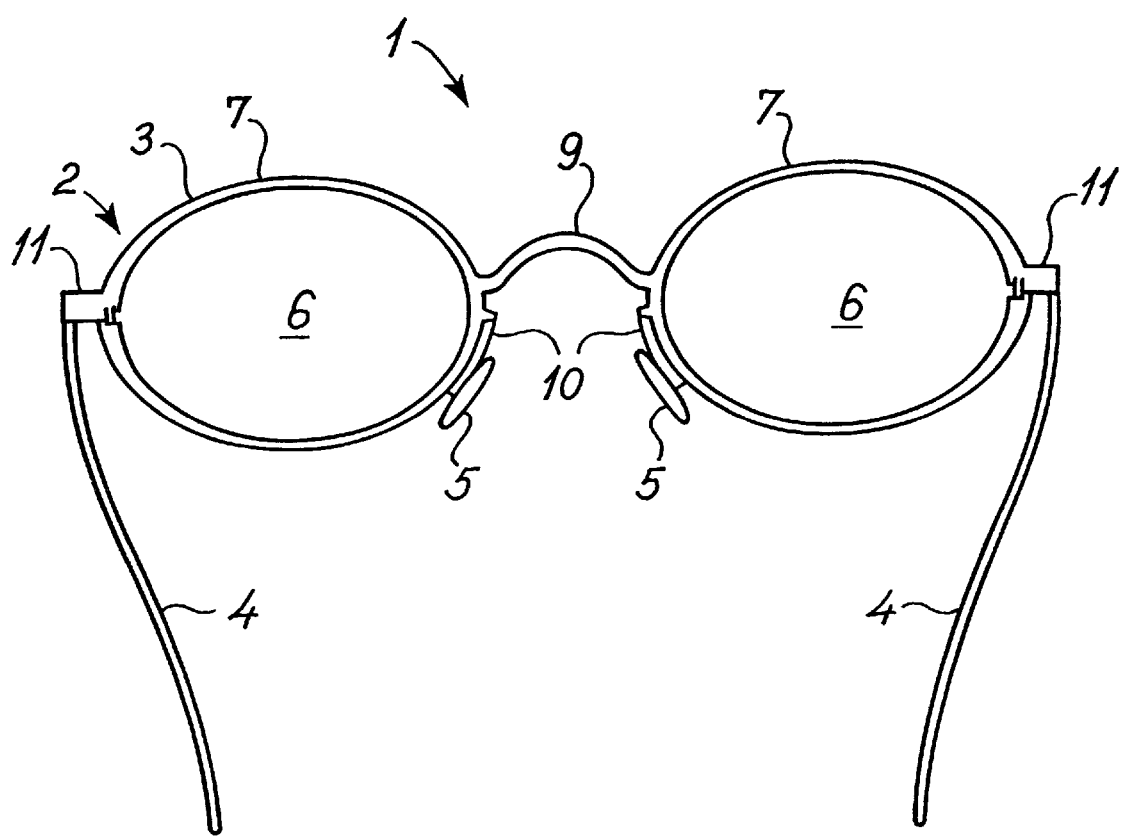
FIG. 1 shows a front elevation of an eyeglass according to the invention.

Reference is first made to FIG. 1 for an overview of an eyeglass 1 according to the invention. This eyeglass mainly comprises an eyeglass frame 2 composed from frame front 3 fitted with temple bars 3 connected to the frame front 3 by means of hinges (not shown). The frame front 3 further comprises a nose bridge 9 and a pair of arms 10 adapted for the fitting of nose pads. The nose pads may be adapted and mounted as explained in international patent application publication WC 98/26324, the contents of which are incorporated hereinto by reference. The frame front 3 features two straps 7 closed to provide respective rims for peripherally engaging respective glasses 6.

Reference is now made to FIG. 2 for further details concerning the frame front 3. FIG. 3 illustrates, in plan view, a blank cut or stamped from a single sheet into a shape generally resembling the frame front, as illustrated in FIG. 2. The blank comprises straps 7 adapted for peripherally engaging the glasses, a central web for forming the nose bridge 9, a pair of arms 10 with respective eyelets for the fitting of nose pads, and two laterally extending portions or front end pieces 11 adapted for the fitting of hinges for securing the temple bars (refer to FIG. 1).

Following cutting of stamping of this blank, various finishing operations are performed to shape various details, e.g. bending and twisting operations, surface finishing operations, etc. in order to arrive at the frame front 3 illustrated in FIG. 1. These operations are considered to lie within the capabilities of those skilled in the art.

The straps 7 in FIG. 2 effectively provide slit rims, open for easy insertion of respective glasses. Upon insertion of a glass the straps are closed by mutually engaging the respective ends under slight resilient deformation so as to arrive at the shape illustrated in FIG. 1, where the rims are closed by mutual engagement of hook means adjacent the strap ends (to be described later on), inner edges or ribs 8 of the straps 7 engaging peripheral grooves in the edges of the glasses (to be described later on).

The blank illustrated in FIG. 2 can be manufactured by a variety of methods and from a variety of sheet materials. A sheet of a titanium alloy with a thickness 0.7 mm has been found to perform satisfactorily. A cutting operation may be carried out by means of a programmable laser cutter or by a programmable water jet cutter. These cutting apparatuses permit cutting according to a set of data entered in software form so as to offer a wide variety of designs. Other methods could be used in other implementations, e.g. stamping or milling methods.

Reference is now made to FIGS. 3 and 4 for a description of the hook means, FIG. 3 illustrating part of the frame front including one pair of complementary hook means belonging to the left side of the frame front as illustrated in FIG. 2. The first hook means comprises a hook or a catch 13 cut in an end portion of a strap with a point oriented inwardly, i.e. to the right in the figure. Part of the end portion of the strap including the catch is joggled or slightly offset from the plane of the remaining portion of the strap by offset 14. Thus the point of engagement of the catch 13 is slightly offset from the plane of the strap.

Second hook means comprises a tongue 12 provided by a reduced extension or projection of the strap that has been bent into a U-shape, as appears from FIG. 4. The first hook means 13 is associated with the strap end in the lower portion of FIG. 3, while the second hook means is associated with the strap end in the upper portion of FIG. 3. The tongue 12 is spaced laterally outwardly of the strap 17 rib 8 in order that the rib 8 may enter a groove in the glass without the tongue 12 interfering with the glass edge. Preferably the spacing of the tongue from the rib 8 essentially matches the depth of a glass groove in. order that the tongue will be located in close proximity of the outer edge of the glass when mounted.

The U-shaped tongue 12 defines a point of engagement slightly offset from the plane of the strap. As shown in FIG. 4, the joggle of the catch 13 matches the offset defined by the U-shaped tongue in order that the respective ends of the strap portion, and in particular of the rib 8, will be located essentially along a single plane when the hook means are interengaged, so as to offer a good match with the groove in the glass. The U-shaped tongue and the catch provide a pair of complementary hook means adapted for being selectively connected or disconnected by mutual displacement along the plane generally defined by the strap. The pair of hook means are formed so as to secure that tension forces normally expected in the strap will create a mild bias towards securing the mutual engagement of the hook means. Thus, selective separation of the pair of hook means will have to overcome this bias.

FIG. 5 illustrates essentially the same details as FIG. 3, but in a state where the hook means have been mutually engaged so as to close the strap 7 to provide a closed rim. A glass fitted in this rim will by its outer margin conceal the rib 8 and the greater part of the opening between the opposed ends of the strap. As seen from the front, the only detail of the slit visible will be a short narrow slit in line with the lower edge of the front end piece 11 and a small recess adjacent the U-shaped tongue 12 in close proximity of the glass edge.

The bending of the tongue and the joggling of the catch could be arranged to either side of the plane of the frame front, however, for aesthetic reasons it is preferred to arrange them at the rear side, i.e. towards the face of the wearer, in order to conceal these details when seen from the front.

The front end piece 11, i.e. the extension adapted for fitting of the temple bar, is integral with that portion of the strap associated with the U-shaped tongue 12. The catch 13 is oriented in such way that separation of the hook engagement takes place by pulling the part associated with the catch 13 laterally away from the glass while restraining the part of the strap associated with the front end piece to stay in its position relative to the glass. By this arrangement pulling in the front end piece 11, as might occur by occasional pulling in the temple bar, would be unlikely to separate the hook engagement, even in case the pull was strong enough to lift part of the strap slightly away from the glass. Thus the glass reliably engages and supports the part of the strap connected with front end piece 11.

However, in other embodiments, where this added support would be considered unnecessary, the arrangement might be reversed or modified.

In a design with a blank cut from a titanium alloy sheet with a thickness of 0.7 mm, a width of the tongue of 0.7 mm and a width of the root of the catch adjacent to the offset of 1.1 mm, it has been established that the resilience in the hook means, i.e. essentially the resilience through elastic bending in the U-shaped tongue and elastic bending of the catch and the offset joggle, will be able to satisfactorily mount glasses of sizes varying over a range of 0.5 mm, referred to glass circumference, obtaining suitable elastic tensioning in the mount of the glasses throughout this range. This range of variation is considered satisfactory, keeping in mind that the grooved glasses can be manufactured by methods widely used to the prescribed size within a band of variation of 0.3 mm, referred to the circumference.

Figure 6:
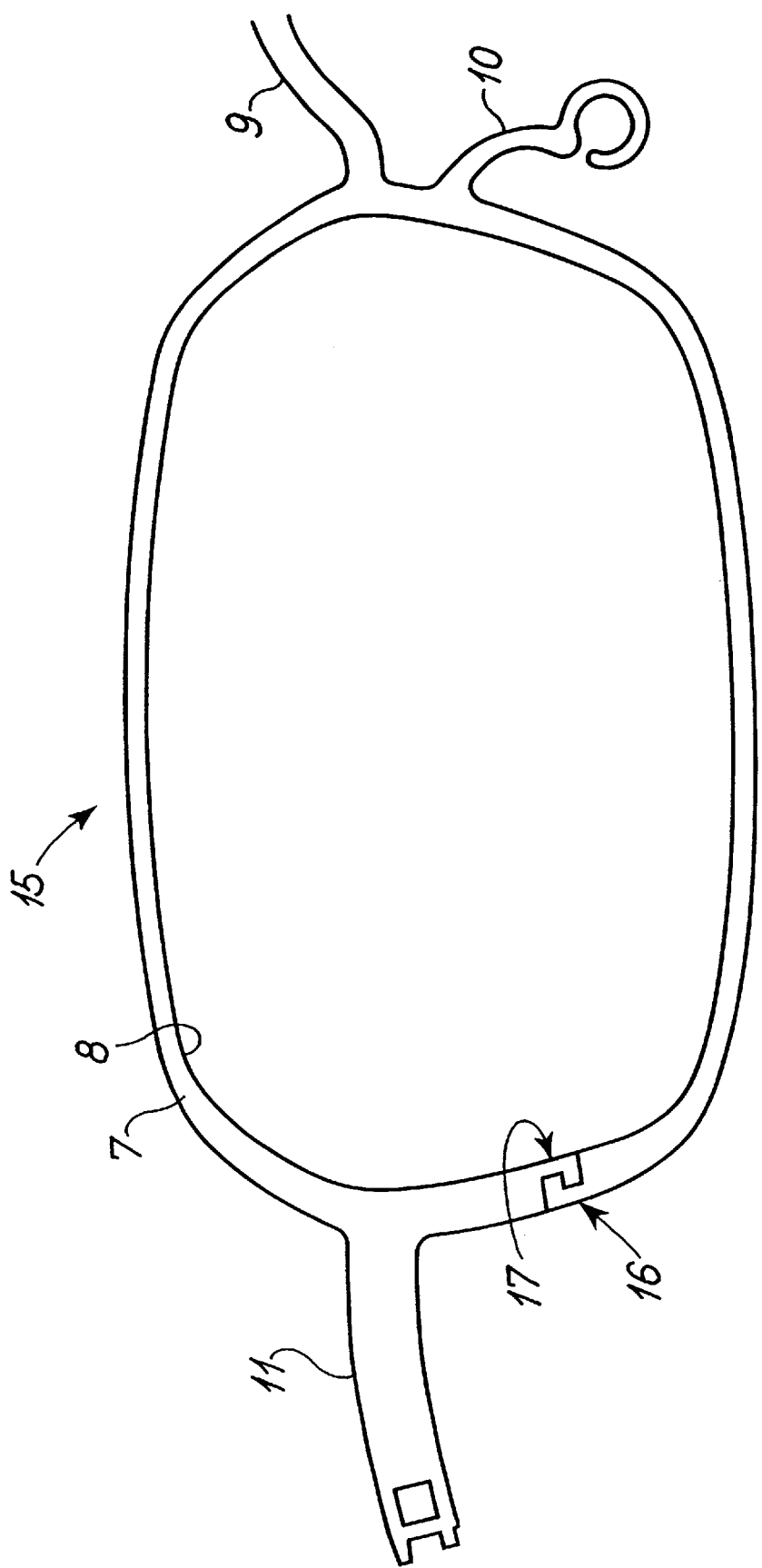
FIG. 6 illustrates part of a frame front according to a second embodiment of the invention.

Reference is now made to FIG. 6 for an explanation of a second embodiment of the frame according to the invention.

FIG. 6 illustrates part of the frame front in a semi-finished condition. The frame front 15 according to the second embodiment is mainly distinguished from the frame front according to the first embodiment by the shape of the closure means. In the second embodiment the strap 7 has been cut from a flat sheet of plate into a shape defining generally a loop with a slit as in the first embodiment. The strap ends have, however, been cut into a pair of mating meanders referred to as first nose part 16, below the slit as shown in FIG. 6, and second nose part 17 above the slit as illustrated in FIG. 6. In the second embodiment, no bending is required for adapting the parts for mutual engagement.

Similar to the first embodiment the latching engagement may be released by pulling the first nose part 16 away from the glass, along the plane of the glass while restraining the second nose part 17, adjacent the front end piece 11. This again has the advantage that any pull in the temple bars secured to the front end piece 11 will be unable to separate the latched parts.

The degree of expansion possible by the resilience in the hook portions is likely to be only minute in this version. Therefore the glass and the strap must be matched to somewhat narrower tolerances, or it may be preferred to rely on other measures to provide resilience as explained below.

Figure 7:
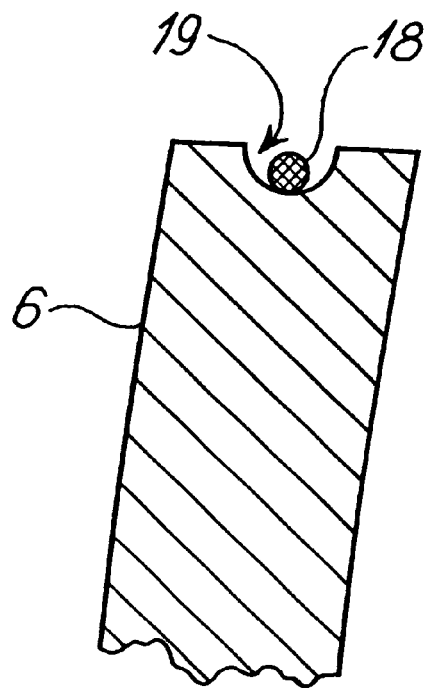
FIG. 7 illustrates a section through an edge portion of glass with an O-ring placed in a groove along the glass edge.
Figure 8:
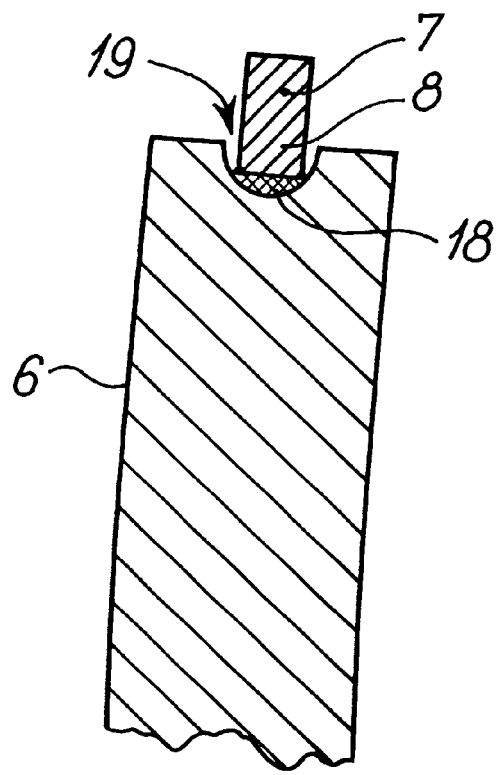
FIG. 8 illustrates a view similar to that of FIG. 7, but in a state where the strap is received by the groove on top of the O-ring.

Reference is now made to FIGS. 7 and 8 for an explanation of an additional means of resilience.

The FIGS. 7 and 8 both illustrate part of the edge of a glass with a peripheral groove as viewed in the direction along the adjacent portion of the groove. FIG. 7 illustrates the glass 6 provided with the peripheral groove 19 and fitted with an additional body 18. The body 18 comprises an O-ring of a resiliently compressible material, such as silicone rubber. The O-ring 18 is matched to the glass so as to be located in the groove in a state of mild tension. Dimensions of the groove may be e.g. a width of 1.0 mm and a depth of 0.5 mm. The core diameter of the O-ring may be e.g. 0.3 mm in the state fitted in the groove.

FIG. 8 illustrates a view similar to FIG. 7 but at a later instant, after the glass has been mounted in the frame. Thus FIG. 8 shows the edge 8 of the strap 7 received inside the groove 19 on top of the O-ring 18, which is compressed resiliently.

A range of O-rings of different sizes may be offered in order to permit adaptation of the fit according to the particular dimensions of the strap member and of the glass so as to ensure that the tension force prevailing in the strap when closed around the glass will stay within suitable limits.

The O-ring placed between the strap and the glass may be used in either embodiment of the frame front. However, the O-ring is particularly preferred together with embodiments of the frame front where the plate parts offer only a small extent of resilient expansion and in user applications where wider manufacturing tolerances must be accommodated.

Although specific embodiments have been explained above for the elucidation of the invention, these embodiments are in no way considered to limit the scope of the invention which may be varied in many ways by one skilled in the art within the scope of the appended claims.

We claim:

1. An eyeglass frame comprising a frame front with front end pieces for the attachment of temple bars and with a pair of strap members, each strap member providing a loop adapted for peripheral engagement around a respective glass and closure means for interconnecting respective opposing strap member ends in generally abutting relationship in order to close said loop, at least one of said strap members comprising a resilient member adapted for resiliently tensioning said one strap member around the glass, the closure means of said one strap member comprising a first and a second opposing hook member, formed integrally with said respective strap member adjacent respective opposing strap member ends, said second hook member being situated adjacent a respective front end piece, said closure means being adapted for allowing release of the engagement by displacement of said first hook member, against a bias by said resilient member, in a direction substantially along the plane of the glass and away from the edge of the glass, while restraining said second hook member in a stationary position relative to the glass.

2. The eyeglass frame according to claim 1, wherein at least one of said front end pieces comprises a respective lateral extension strip and wherein the opposing strap ends of a respective strap member adjacent said one front end piece are joined in mutually abutting relation so as to create the visual impression, as seen from the front, of a narrow slit extending along the direction of an edge of said extension strip.

3. The eyeglass frame according to claim 1, wherein said resilient member comprises at least part of at least one of aid opposing hook members.

4. The eyeglass frame according to claim 1, wherein said hook members are formed by cutting a pair of mating nose parts in a single piece of sheet material.

5. The eyeglass frame according to claim 1, wherein at least one of said opposing hook members comprises a sheet member with a part that is resilient in bending so as to provide at least part of said resilient member.

6. The eyeglass frame according to claim 5, wherein said frame front, said hook members, said front end pieces and said arms for securing the nose pads, are formed from a single piece of sheet material by cutting and bending operations.

7. The eyeglass frame according to claim 5, wherein said first hook member comprises a projecting tongue cut from said piece of sheet material and partially bent away from the plane of said piece of sheet material and into a U-shape, and wherein said second hook member comprises a hook extension provided by cutting and joggling operations.

8. The eyeglass frame according to claim 1, wherein said resilient member comprises a compressible body, adapted for being inserted between a respective strap member and a glass.

9. The eyeglass frame according to claim 8, wherein the compressible body comprises an O-ring, adapted for being placed in peripheral contact with the glass.

10. An eyeglass comprising an eyeglass frame, which frame comprises a frame front with front end pieces for the attachment of temple bars and with a pair of strap members, each strap member providing a loop adapted for peripheral engagement around a respective glass and closure means for interconnecting respective opposing strap member ends in generally abutting relationship in order to close said loop, at least one of said strap members comprising a resilient member adapted for resiliently tensioning said one strap member around the glass, the closure means of said one strap member comprising a first and a second opposing hook member, formed integrally with said respective strap member adjacent respective opposing strap member ends, said second hook member being situated adjacent a respective front end piece, said closure means being adapted for allowing release of the engagement by displacement of said first hook member, against a bias by said resilient member, in a direction substantially along the plane of he glass and away from the edge of the lass, while restraining said second hook member in a stationary position relative to the glass.

11. The eyeglass according to claim 10, wherein at least one of the glasses is provided with a circumferential groove adapted for mating engagement with an inner edge of a respective strap member, in order that the glass receives and supports an edge of the respective strap member.

12. A method for the manufacturing of an eyeglass, comprising selecting a sheet of material, cutting from said sheet a blank including a pair of strap members, each strap member comprising an open loop with a slit and with a pair of cooperating opposing hook members adjacent the slit, providing in respect of each of said strap members a resilient means, inserting a pair of glasses, to be engaged each glass by a respective strap member, and closing the strap members around the respective glasses with the respective pair of opposing hook members in latching engagement so as to tension said strap members around the respective glasses.

13. The method according to claim 12, comprising providing in a peripheral edge of each glass a notch, and placing in said notch, prior to the step of engaging the glass by the strap, an O-ring of a resilient material.

14. The method according to claim 13, comprising the step of selecting the size of the O-ring according to the particular dimensions of the glass and of the strap member in order to adjust the tension prevailing in the strap member, when latched around the glass.

* * * * *

UNITED STATES PATENT AND TRADEMARK OFFICE
CERTIFICATE OF CORRECTION

PATENT NO. : 6,276,796 B1  Page 1 of 1
DATED : August 21, 2001
INVENTOR(S) : Poul-Jørn Lindberg and Lars Bojvad Jensen It is certified that error appears in the above-identified patent and that said Letters Patent is hereby corrected as shown below:

Title page,
Change [73] Assignee: "Lindberg A/S, Abyjoj (DK)" to
-- [73] Assignee: Lindberg A/S Abyhoi (DK) --

Column 4,
Line 17, "embers" should be -- members --;

Column 5,
Line 61, after "in" delete -- . --.

Column 8,
Line 3, "aid" should be -- said --;
Line 60, "he" should be -- the --;
Line 61, "lass" should be -- glass --;

Signed and Sealed this

Twenty-eighth Day of May, 2002

Attest:

Attesting Officer

JAMES E. ROGAN
Director of the United States Patent and Trademark Office